United States Patent [19]

Ludwig

[11] 4,273,157
[45] Jun. 16, 1981

[54] THREE WAY BUTTERFLY VALVE

[75] Inventor: George C. Ludwig, Owosso, Mich.

[73] Assignee: Tom McGuane Industries, Inc., Madison Heights, Mich.

[21] Appl. No.: 959,743

[22] Filed: Nov. 13, 1978

[51] Int. Cl.$^3$ ................................................ F16K 5/00
[52] U.S. Cl. .............................. 137/887; 137/625.46; 137/876
[58] Field of Search ................... 137/625.46, 887, 876, 137/875; 251/305; 123/41.09

[56] References Cited

U.S. PATENT DOCUMENTS

| 929,944 | 8/1909 | Hawley et al. ..................... 137/875 |
| 2,395,997 | 3/1946 | Eckel .......................... 137/625.46 X |
| 3,228,653 | 1/1966 | Trimmer ..................... 137/625.46 X |
| 3,373,771 | 3/1968 | Boyen .............................. 137/625.46 |
| 3,480,040 | 11/1969 | Erickson .......................... 251/120 X |
| 3,888,458 | 6/1975 | Bubniak et al. .................. 251/305 X |
| 3,995,446 | 12/1976 | Eubank ....................... 137/625.46 X |

FOREIGN PATENT DOCUMENTS 4077 3/1905 France ..................................... 137/876

Primary Examiner—William E. Tapolcai, Jr.
Attorney, Agent, or Firm—Remy J. VanOphem

[57] ABSTRACT

A vacuum controlled three way butterfly valve for regulating the flow of fluids, as in internal combustion engine cooling systems and automotive heater systems, wherein a valve body includes a bypass port located in spaced relationship to the valve plate. In one position, the valve plate stops the flow of fluid through the valve body and permits the flow of fluid to return to the engine water pump. In the other position, the valve plate blocks off the bypass port, permits the flow of fluid through the valve body then restricts the throughput of fluid by means of a resilient orifice to protect the heater downstream of the valve core from excessive fluid pressure developed by the engine water pump and then to return the flow of fluid to the engine water pump.

10 Claims, 5 Drawing Figures

THREE WAY BUTTERFLY VALVE

BACKGROUND OF THE INVENTION

1. Field of the Invention

This invention relates to butterfly valves and particularly to butterfly valves as utilized for controlling the flow of fluids through three ports.

2. Description of the Prior Art

Butterfly valves having disc-shaped butterfly valve plates rotatable about an axis in the bore of the valve body are generally known in the prior art. Valves of this general description are employed in a variety of applications because of their straight flow-through construction and their excellent dirt handling characteristics.

In controlling the flow of fluids as in automotive heater systems coupled with air conditioning systems, it is common to shut off the flow of fluid to the heater core by means of a butterfly valve when the air conditioning system is in the maximum air conditioning mode. This permits the cold air from the air conditioner to pass through the heater core without transferring any heat from the heater to the cold air and thence directly to the passenger compartment. It is also common for liquid cooled internal combustion engines to be provided with a liquid bypass ahead of the heater shut-off valve to return liquid to the water pump when the engine block thermostat is closed to assist in the rapid warm-up of the engine block and associated components.

It has also been found desirable to restrict the flow of fluid to the heater core in order to protect it from excessive fluid pressure developed by the engine water pump at certain engine speeds.

U.S. Pat. No. 1,992,789 discloses a pivotally mounted butterfly valve which regulates the flow of fluid as in automotive heater systems. This valve has three ports. However, the butterfly valve is located such as to regulate the flow through only one port. Furthermore, the valve does not attempt to protect the heater core from excessive fluid pressure developed by the engine water pump.

U.S. Pat. No. 2,610,798 discloses a three way butterfly valve wherein the valve body is made from a "T" section fitting. A cup-shaped valve seat is secured to the main body of the "T" section fitting near the upright portion of the "T" section fitting. The valve seat carries a valve disc pivotally mounted thereon and adapted for movement between a first position closing an aperture formed in the valve seat and a second position in which the valve disc covers the open end of the upright portion of the "T" section fitting. This valve design does not protect the heater core from excessive fluid pressure developed by the engine water pump.

Neither of the above cited valve designs considered the possibility of eliminating the commonly used engine water bypass ports in the engine block with the attendant reduction in complications of small hoses and clamps. Furthermore, neither prior art design addressed the problem of leakage around the periphery of the valve disc and the need for virtually no leakage through the valve, as in automobile heating systems with air conditioning systems.

SUMMARY OF THE INVENTION

The present invention confers, upon a three way butterfly valve, the ability to close tightly with virtually no leakage through the main passage to the heater core when the automobile air conditioning system is set in the maximum air conditioning mode. The valve also eliminates the liquid bypass port in the engine block to the water pump and protects the heater core against excessive fluid pressure developed by the water pump.

In accordance with the invention, a three way butterfly fluid flow valve assembly comprises a valve body having a portion formed with a cylindrical bore interposed a fluid inlet and a fluid outlet. A bypass passageway is mounted to the side of the valve body and projects internally approximately midway into the cylindrical bore.

A pin is positioned transversely into the cylindrical bore in spaced relationship downstream of the bypass passageway. A disc shaped valve plate, formed with a diametrical flat portion, is mounted on the pin within the cylindrical bore for rotation about the pin.

In assembly, the valve plate is brought into position with the diametrically extending portion engaging the pin. The valve plate is then moved angularly and radially until the periphery of the plate is in sealing engagement with the inner surface of the passage in the body. The plate is then fastened to the pin as by welding. Downstream of the valve plate is a flexible orifice disc flow control valve which reduces the pressure at the fluid outlet. The valve plate is rotated from a first position closing off the flow of fluid through the cylindrical bore to permit flow only through the bypass passageway, to a second position in which the valve plate covers the bypass passageway to permit flow through the valve body while closing off the flow through the bypass port.

Accordingly, the objects of the invention are to provide a three way butterfly valve which will minimize the problem of leakage between the valve plate and the periphery of the cylindrical passage and provide a fluid bypass when the valve plate is in closing relationship with the periphery of the cylindrical passage.

Another object of the invention is to provide a three way butterfly valve which will minimize the problem of leakage between the valve plate and the periphery of the cylindrical passage and incorporate a fluid flow control orifice in the body of the valve downstream of the valve plate.

Still another object of the invention is to eliminate the requirement of a water pump bypass port in the engine block thereby reducing the complications of small hoses and clamps and provide a less expensive combination of water pump bypass, heater core pressure restrictor while accommodating a heater system and air conditioning system with one butterfly valve design.

A further object of the invention is to provide a method of making a three way valve which obviates the problem of leakage between the valve plate and the periphery of the cylindrical passage, incorporates an orifice in the body of the valve downstream of the valve plate and incorporates within the valve a means for bypassing the engine water pump outlet flow when the engine thermostat is closed.

DETAILED DESCRIPTION OF THE PREFERRED EMBODIMENTS

Figure 1:
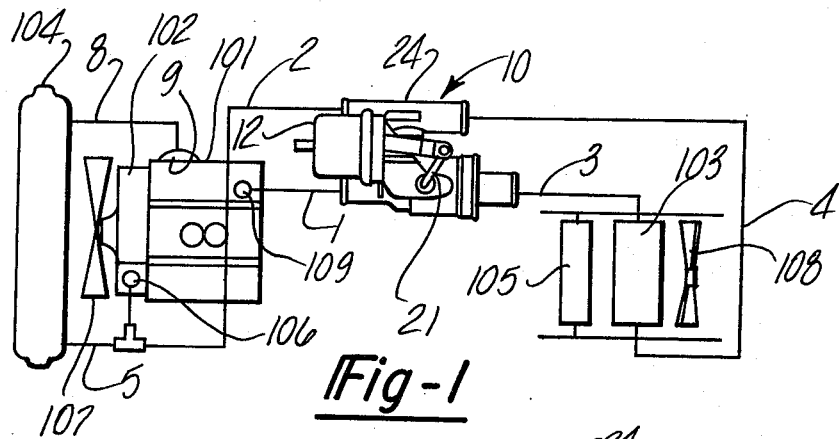
FIG. 1 is a side elevational view of a three way butterfly valve showing its use in an internal combustion engine vehicle environment.

Referring to FIG. 1, the invention is shown in connection with an automotive heating system coupled with an air conditioning system. The automobile engine is indicated as 101, the water pump as 102, the radiator as 104, the heater core as 103, the air conditioning evaporator core as 105, the engine cooling fan as 107, the heater or air conditioning blower fan as 108, and the inlet port to the water pump as 106. The above components as thus described follow the conventional design for liquid cooling of internal combustion engines. The present invention contemplates a modification of the conventional method of routing the fluid when the engine thermostat 9 is closed as during the warm up of the engine. Normally, it is common to provide an external bypass port with hoses and clamps connecting the cooling passages in the engine block with the intake to the water pump. This external bypass permits the circulation of the cooling liquid from the water pump, through the engine block cooling passages and return the flow of fluid to the water pump through the bypass. The present invention eliminates the need for the aforementioned bypass passage and routes the fluid from the internal cooling passages in the engine block through port 109 into line 1 and then into the butterfly valve 10. This valve incorporates a bypass port tee 24 that is mounted to the side of the valve body. The valve includes a vacuum control motor 12 to move the valve plate 13 and thereby control the flow of fluid through the valve. During the warm-up mode, the fluid is permitted to flow in either of two directions through the valve depending on the position of the valve plate. In one position (shown in FIG. 2), the fluid into the valve can be made to flow through the bypass port and one leg of the tee into line 2 and thence directly into the inlet port of the water pump. In the other position (illustrated in FIG. 2), the fluid can be made to flow through the valve, into line 3 and then into the heater core. From the heater core, the fluid is made to flow into line 4 which connects the heater core outlet to the other leg of the bypass port tee 24 and thence directly into the inlet port 106 of the water pump. Thus, in either position of the valve plate, the fluid within the engine block is circulated back to the water pump. When, however, the valve is in the first position, that is when the valve plate closes off the flow through the valve body and the fluid flows through the bypass passageway and thence directly into the inlet port of the water pump when the engine thermostat is closed, the valve permits the rapid and uniform heating of the engine block and associated hardware. When the engine thermostat opens, the engine cooling fluid is permitted to flow in its conventional manner, that is, into line 8, then into the radiator 104, then out of the radiator by line 5 and into the inlet port 106 of the water pump. A limited amount of fluid is permitted to flow through port 109 when the thermostat is in an open position.

Figure 5:
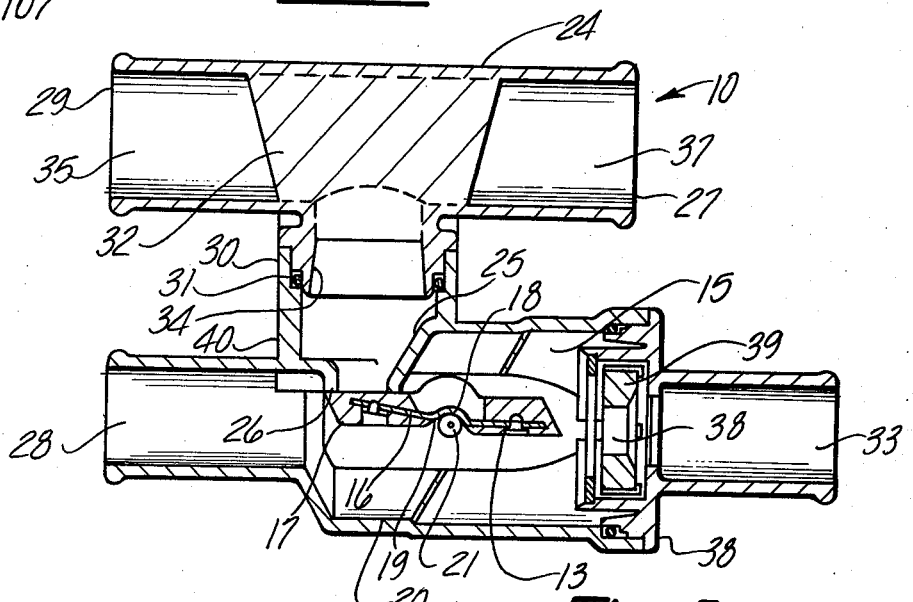
FIG. 5 is a longitudinal sectional view of the valve assembly with the valve plate shown restricting flow through the bypass port.

As shown in FIG. 5, the valve 10 includes a body having a passage 15 that is generally cylindrical. A bypass passage tee, with its short leg 30 abutting the valve body, is fastened by brazing, soldering or ultrasonic welding, to the side of the valve body which has an internally formed passageway 40 cast or moulded in its side to accommodate the short leg of the bypass passage tee. Interposed said short leg and the passageway is a square ring seal 31. The passageway further has an opening 25 which is dulled or formed therethrough and terminates internally in the cylindrical passageway with a face seat 26 which is dulled or formed therethrough and terminates internally in the cylindrical passageway with a face seat 26 which is substantially parallel to the axis of the cylindrical passage. The crossmembers of the tee fitting of the bypass port tee include the fluid outlet 29 and the inlet 27 from the water heater. Both the inlet 27 and the outlet 29 are formed or moulded thereon to the crossmembers of the tee fitting. The bypass port tee further has an opening 34 at its short leg, an opening 37 at its inlet 27, an opening 35 at its outlet 29 and a flow straightener rib 32 in the passageways connecting the openings 34, 35 and 37. The flow to each other straightener rib reduces the fluid flow turbulence and attendant fluid pressure losses through these passages during the various modes of operation herein described. The valve body, bypass passage and bypass passage tee may be formed, cast or moulded from metal, plastic or any other suitable material. The valve plate 13 comprises a metal plate 16 which has a resilient body 17 embedded about its periphery. The valve plate has a diametrically extending central portion 18 with a flat planar portion 19 that is at an acute angle to the general plane of the metal plate 16. The position of the planar portion 19 is such that when the periphery of the valve 13 is in sealing engagement with the inner surface 20 of the passage 15, the planar portion extends radially of the cylindrical passage and perpendicular to the axis of said passage and the valve is at an acute angle to the axis of the cylindrical passage.

Figure 2:
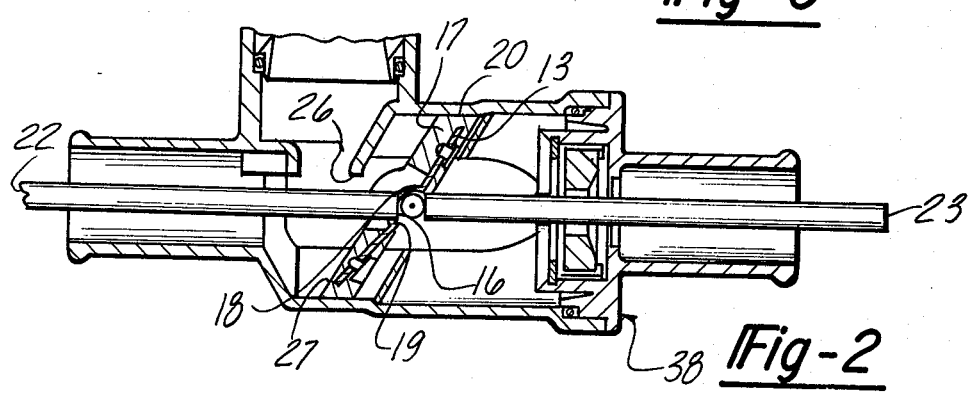
FIG. 2 is a partial longitudinal section view of the valve body assembly with the valve plate shown in position for maximum air condition mode of operation, and with weld electrodes for assembly as shown.

As shown in FIG. 2, the valve plate has on its upstream lower half portion, a valve seat seal 27. The valve seat seal is located on the valve plate so as to be in contact with the face seat 26 of the bypass passageway when the valve plate is in substantially parallel position with respect to the axis of the cylindrical passage 15.

Returning to FIG. 5, an inlet port 28 is moulded, formed or cast to the valve body upstream of the valve plate and bypass passageway. An outlet port 33 is formed, moulded or cast to an outlet end plate 38 which is made from metal or any other suitable material such as plastic. The outlet end plate 38 is fastened to the valve body by any convenient means such as by welding or soldering. A resilient flow control orifice member 39 is attached to the outlet end plate such that it is downstream of the valve plate but upstream of the outlet port.

The resilient flow control orifice is sized to restrict the flow of fluid through the outlet port to control the fluid pressure through the outlet port controlling the fluid pressure that acts on the components downstream of the valve as, for example, to protect the heater core of an automotive heating system from excessive water pump pressures which may cause the heater core to leak. The resilient flow control has an additional feature which has been found to be desirable in certain applications such as, for example, an automotive heating system. It has the ability at high fluid pressure conditions to deform and thus decrease the flow passage 36 to permit a substantially constant fluid throughput as compared to the flow throughput normally experienced at lower pressures. In other applications, it may be found necessary to have a fixed flow control orifice for all fluid pressure ranges and, in some applications, where the maximum flow through the outlet port is desired and pressure considerations are negligible, it may be found desirable to eliminate the flow control orifice.

In assembling the valve plate to the valve body, a pivot pin 21 is positioned in the valve body so as to extend generally diametrically of the passage 15 and in spaced relationship to the bypass passage face seat 26. The valve plate is then brought into position such that the pin engages the planar portion of the valve plate 15 with the valve seat in predetermined relationship therewith so that the valve seat seal is in the lower half portion of the valve plate when facing upstream in the valve body. The valve 13 is then moved radially as well as angularly with respect to the axis of the pivot pin 20 until the periphery of the valve is in sealing relationship with the entire circumference of the surface 20 of passage 15. The valve 13 is then fastened to the pin as by bringing electrodes 22 and 23 into engagement with the pin and central portion 18 and by welding the plate to the pin.

Thus, when the valve is rotated about the axis of the pivot pin to close the cylindrical passage, a sealing relationship between the periphery of the valve and surface 20 is insured and when the valve plate is rotated so as to be in substantially parallel position with respect to the axis of said cylindrical passage, the valve seat seal 27 is in engagement with the face seat of the bypass passageway 26 regardless of manufacturing tolerances. The valve seat seal need not be in perfect sealing engagement with the face seat of the bypass passageway since leakage through the bypass port does not materially affect the function of the heater core and comfort of the operator since there is usually an excess of heat available through the heater core for adequate operator comfort. The flexability of the valve seat seal 27, however, will minimize leakage.

Figure 4:
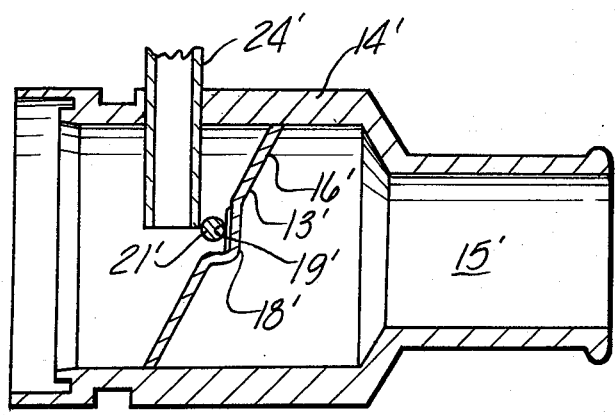
FIG. 4 is a longitudinal sectional view of a modified form of the valve assembly.

Although the invention has been described in connection with a water valve, it also has utility in other types of valves where fluid flow is controlled, wherein a resilient seal is not provided on the periphery of the valve plate and a resilient flow control orifice is not required. For example, as shown in FIG. 4, the body 14 has a bypass port 24 projecting approximately midway into cylindrical passage 15 and terminates in the cylindrical passage with a face seat 26. The body is provided with a pivot pin 21. The valve plate 13 is made of metal, plastic or any other suitable material and has a corresponding central portion 18 that includes a planar portion 19 that forms an acute angle with the plane of the plate 16 and extends diametrically of the passage 15 when the valve 13 closes the cylindrical passage. When the valve plate is in parallel position with the axis of the cylindrical passage, the valve plate engages the face seat on the bypass passage.

The preferred embodiment is also shown in FIG. 5 where all elements depicted are the same as in FIG. 2 with the valve plate 13 shown against face seat 26 to close the bypass port passageway 25.

While the invention has been described in conjunction with specific embodiments thereof, it is evident that many alternatives, modifications and variations will be apparent to those skilled in the art, in light of the foregoing description. Accordingly, it is intended to embrace all such alternatives, modifications and variations as fall within the spirit and broad scope of the appended claims.

What I claim is:

1. A vacuum control valve assembly for regulating coolant flow in a vehicle heating and air conditioning system, said valve comprising:
   a housing having a first passage therethrough, said first passage having a cylindrical portion;
   a bypass passageway having an inlet projecting into said cylindrical portion of said first passage at one end and terminating into an outlet at an opposite end;
   a pivot pin mounted transverse said cylindrical portion of said first passage to said housing and further mounted in spaced relationship downstream of said inlet of said passageway;
   a valve plate centrally mounted to said pivot pin for rotation therewith such that when said pivot pin and said valve plate are rotated to a first predetermined position, said valve plate communicates with said cylindrical portion of said first passage to terminate fluid communication therethrough and establish fluid communication through said bypass passageway and when said valve plate and said pivot pin are rotated to a second predetermined position, said valve plate communicates with said inlet of said bypass passageway to establish fluid communication through said first passage of said housing; and
   first means for restricting the flow of fluid through said first passage when said valve plate is in said second predetermined position.

2. A vacuum control valve as set forth in claim 1 wherein said valve plate has a central flat planar portion extending radially of said cylindrical portion when said valve plate is in said first predetermined position and wherein the peripheral portion of the valve plate is formed with a resilient material that communicates with said cylindrical portion when said valve plate is in said first predetermined position.

3. A vacuum control valve as set forth in claim 1 wherein said valve plate has a central flat planar portion extending radially of said cylindrical portion when said valve plate is in said first predetermined position and wherein substantially the entire valve plate except for said planar portion is embedded in resilient material.

4. a Vacuum control valve as set forth in claim 3 wherein said second means for restricting further comprises:
   a valve seat seal on the lower half upstream side of said valve plate; and
   means for rotating said valve plate into said second predetermined position.

5. A vacuum control valve as set forth in claim 3 further comprising:
   means for controlling the flow of fluid through said cylindrical portion downstream of said valve plate when said valve plate is not in sealing engagement with the interior surface of said cylindrical passage.

6. A vacuum control valve as set forth in claim 5 wherein said controlling means comprises:
   a flow control restrictor mounted in said cylindrical passage downstream of said valve plate.

7. A vacuum control valve as set forth in claim 6 wherein said flow control restrictor is a resilient orifice.

8. A vacuum control valve as set forth in claim 1 further comprising second means for restricting fluid communication through said bypass passageway when said valve plate and said pivot pin are rotated to said second predetermined position.

9. In a butterfly valve, the valve comprising:
   a housing having an opening therethrough, at least a portion of said opening defining a cylindrical passage;
   a bypass passageway mounted to the side of said housing, said passageway further having a projection which protrudes approximately midway into said cylindrical passage, said projection further having a face seat on its protruding end;
   a pivot pin mounted diametrically through said housing across said cylindrical passage in spaced relationship to said face seat on said projection;
   a metal valve plate engaged to said pivot pin, said valve plate having a diametrically extending central flat planar portion which extends radially of said cylindrical passage and perpendicular to the axis of said cylindrical passage when said valve plate is in inclined position with respect to the axis of said cylindrical passage whereby said valve plate stops the flow of fluid through said cylindrical passage and permits the flow of fluid through said bypass passageway when said valve plate is in a first predetermined position and said valve plate restricts the flow of fluid through said bypass passageway and permits the flow of fluid through said cylindrical passage when said valve plate is in a second predetermined position;
   said valve plate having at least the peripheral portion thereof formed with a resilient gasket that engages the interior surface of said cylindrical passage when said planar portion is perpendicular to the axis of said cylindrical passage and the general plane of the valve plate forms an acute angle with respect to the axis of said cylindrical passage;
   means for restricting the flow of fluid through said bypass passageway when said valve plate is in parallel position with respect to the axis of said cylindrical passage and in positional relationship to said face seat on said projection;
   a resilient orifice mounted in said cylindrical passage so that the fluid downstream of said valve plate is restricted to a predetermined pressure level; and
   whereby said planar portion of said valve plate is first positioned centrally of said cylindrical passage with said flat portion engaging said pin before fastening said plate to said pin.

10. The valve as set forth in claim 9 wherein substantially the entire valve plate except for the planar position is embedded in resilient material.

* * * * *

UNITED STATES PATENT AND TRADEMARK OFFICE
CERTIFICATE OF CORRECTION

PATENT NO. : 4,273,157
DATED : June 16, 1981
INVENTOR(S) : George C. Ludwig

It is certified that error appears in the above—identified patent and that said Letters Patent is hereby corrected as shown below:

Column 3, line 40, after "plate 13" insert ----(shown in Figures 2 and 5)----.

Figure 3:
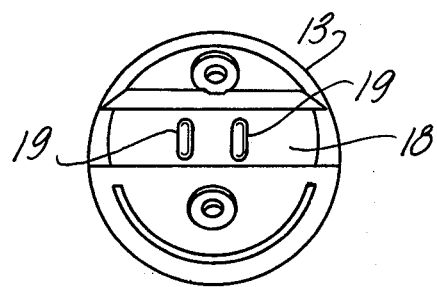
FIG. 3 is an end view of the valve plate.

Column 4, line 32, delete "The" and insert ----As shown in Figures 2, 3, and 5, the----.

Column 5, line 24, after "22 and 23" insert ----(Figure 2)----.

Column 5, line 61, delete "is also" and insert ----as----.

Column 5, line 62, after "FIG. 2" insert a comma.

Column 5, line 63, delete "with".

Column 5, line 64, delete "25" and insert ----15----.

Column 6, line 50, delete "a Vacuum" and insert ----A vacuum----.

Signed and Sealed this

Seventeenth Day of November 1981

[SEAL]

Attest:

GERALD J. MOSSINGHOFF

*Attesting Officer*   *Commissioner of Patents and Trademarks*

UNITED STATES PATENT AND TRADEMARK OFFICE
CERTIFICATE OF CORRECTION

PATENT NO. : 4,273,157

DATED : June 16, 1981

INVENTOR(S) : George C. Ludwig

It is certified that error appears in the above-identified patent and that said Letters Patent is hereby corrected as shown below:

Column 6, line 51, delete "second" and insert - - - first - - -.

Signed and Sealed this

Thirty-first Day of May 1983

[SEAL]

Attest:

DONALD J. QUIGG

Attesting Officer

Acting Commissioner of Patents and Trademarks